June 11, 1946.　　R. M. GREENLEAF ET AL　　2,402,041
WHEEL ATTACHMENT
Filed March 20, 1944　　2 Sheets-Sheet 2

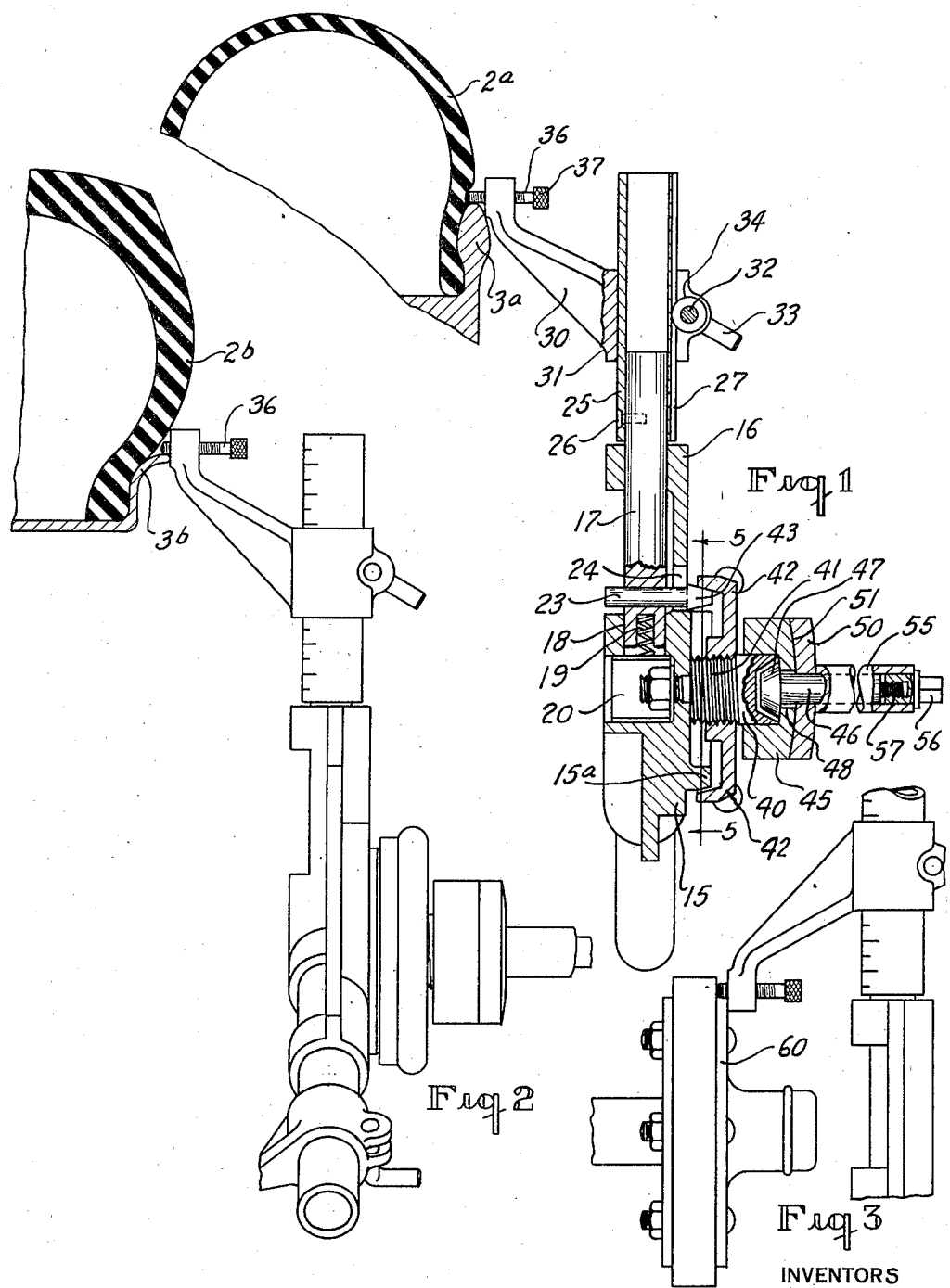

INVENTORS
Robert M. Greenleaf
John L. Hunt
BY
Barnes, Kisselle, Laughlin & Raisch
ATTORNEYS.

Patented June 11, 1946

2,402,041

UNITED STATES PATENT OFFICE 2,402,041

WHEEL ATTACHMENT

Robert M. Greenleaf and John L. Hunt, Grosse Pointe, Mich., assignors to M. L. Trust, F. R. Pendleton, trustee, Everett, Wash.

Application March 20, 1944, Serial No. 527,195

9 Claims. (Cl. 248—201)

This invention relates to a wheel attachment designed and particularly for use in attaching a gauging instrument or testing device to a wheel for checking wheel-roll, and particularly to the wheels of an automotive vehicle.

We need not go into a detailed explanation herein of the advantages and even the necessity of checking wheel-roll. Suffice it to say that numerous factors or conditions such for example, as improper wheel settings, axle disalignment, bent frames, etc., cause improper wheel-roll which may result in excessive tire wear. Side slip of a wheel may be in condition caused by one or more of the improper settings or conditions resulting in excessive tire wear. It is most essential in commercial vehicles, such as the so-called trucks and in multi-wheeled vehicles operating under heavy loads, to have as nearly as is practical a proper and true wheel-roll for minimum tire wear. It is becoming more and more appreciated and desired to have a correct wheel-roll condition on the landing gear of airplanes. Of course for the most economical use of rubber true wheel-roll conditions should also be present on passenger automobiles. One instrument for checking wheel-roll is a device which employs the tracer wheel principle which is attached co-axially with the wheel and which operates over the ground as the vehicle is moved. Such a device is shown in the Robert M. Greenleaf and Paul C. Palmer Patent No. 2,137,485 of November 22, 1938.

The present invention aims to provide an improved attaching device for attaching a wheel checking instrument to the wheel. It is a further aim to provide an attaching device of universal application which can be attached to wheels of varying types and diameters, including airplane wheels of the stream line character, and also which can be attached to a wheel hub. The apparatus of this invention may, of course, be used for attaching any sort of instrument or gauging device to a wheel and when reference is made to a vehicle wheel this reference includes an airplane landing gear wheel.

A structure for carrying out the invention is shown in the accompanying drawings. In these drawings:

Fig. 1 is a cross sectional view taken through a device constructed in accordance with the invention and showing the device attached to a wheel of a stream line nature such as is employed in some airplanes.

Fig. 2 is a view largely in elevation showing the device attached to an automobile wheel with the rim and tire of the wheel shown in cross section.

Fig. 3 is a partial elevational view showing the device as applied to a wheel hub.

Figure 4:
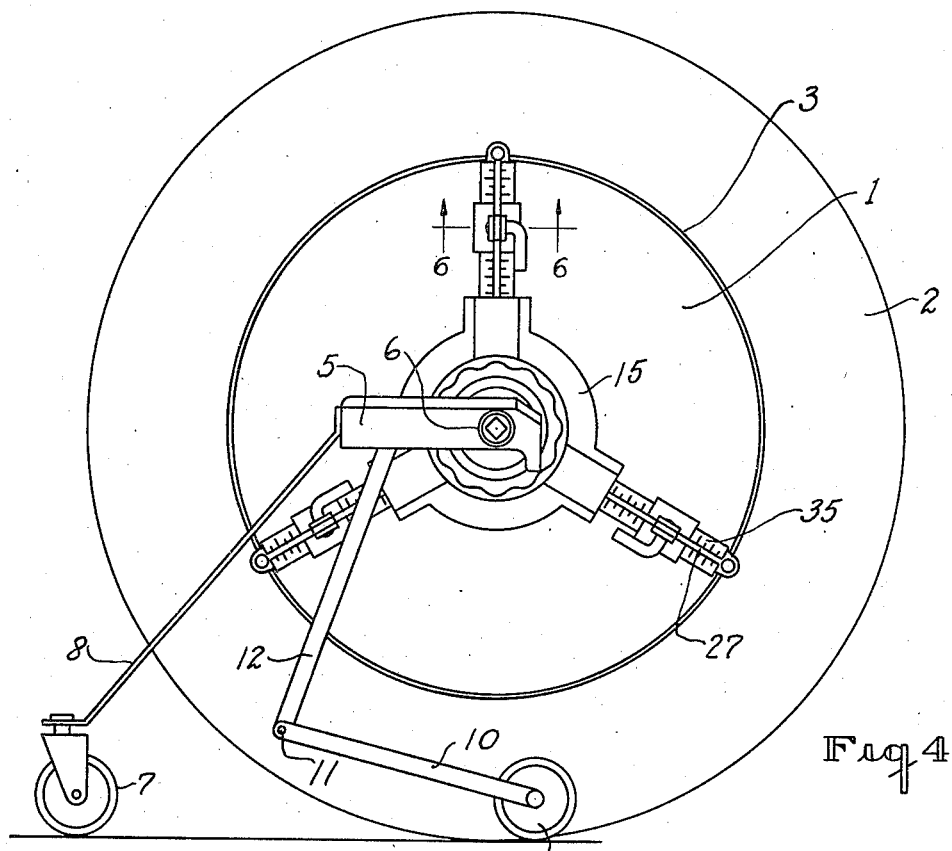
Fig. 4 is a side elevational view showing the device attached to a wheel and illustrating the trailing wheel instrument.

By making reference first to Fig. 4, a wheel is illustrated at 1 with a pneumatic tire mounted thereon and with the rim of the wheel shown at 3. The attachment is for pivotally mounting the tracer wheel instrument co-axially with the wheel axis and this instrument has a body 5 with an opening therein as at 6 arranged to be swiveled on the wheel axis. The body is supported from the ground by means of a wheel 7 connected to the body by a bracket 8 and the tracer wheel which runs along the ground is shown at 9. The tracer wheel is carried by an arm 10 pivotally connected as at 11 to an arm 12 which extends into the body 5 and which is for the purpose of operating the instrument. No further description of the instrument will be given except to say that as the wheel 2 is moved along the ground the tracer wheel causes appropriate operation and indication by the instrument to check wheel-roll.

The attaching instrument comprises a main body 15 provided with extensions 16 of which there are preferably three in number for receiving arms for carrying gripper devices for attachment to the wheel. Each arm takes the form of a rod 17 slidably received in an extension 16 and slidably received in a socket in the hub portion of the body 15 as at 18. A coil spring 19 is disposed in a recess at the inner end of each arm and the spring is backed up by a spring retainer in the form of a sleeve 20 positioned in the hollow portion of the body member. A pin 23 is affixed to each rod as by means as being pressed fitted therein and each pin projects through an elongated slot 24.

On the outer end of each rod is a replaceable arm section in the form of a tube 25 telescoped over the rod 17 and attached thereto by a screw 26. A gripper arm or bracket 30 has a hub 31 slidably mounted on each tube and the hub is split so that it can be contracted and adjustably clamped to the tube by a screw clamp generally indicated at 32 and provided with a handle 33. Each tube has a slot 27 and a washer member 34 lying in the slot 27 prevents rotation of the gripper arms 30 on the tubular sections 25. Each tube advantageously and preferably has markings thereon in the form of a scale as shown at 35 for giving a general indication of the position of adjustments of the gripper arms for a given wheel diameter. A hardened screw member 36 with means for turning the same such as an enlarged or knurled head 37 is threaded into each gripper arm.

Mounted in the central portion of the body 15 is a stud 40 provided with screw threads 41 and mounted on the threaded portion of the stud is a clamping or tightening member 42.

Figure 5:
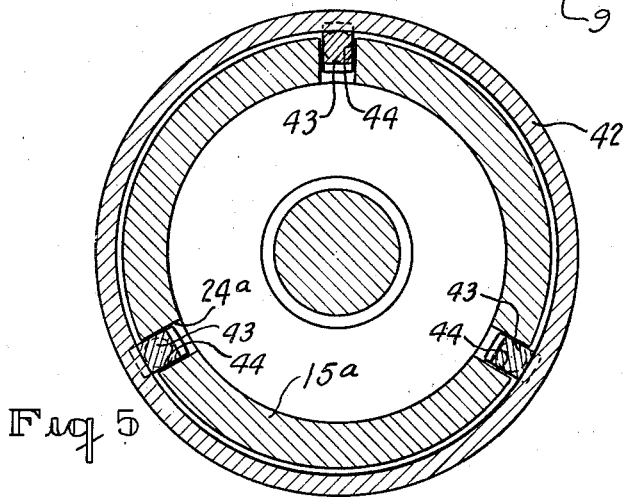
Fig. 5 is an enlarged cross sectional view taken substantially on line 5—5 of Fig. 1 showing the quick adjusting mechanism.
Figure 6:
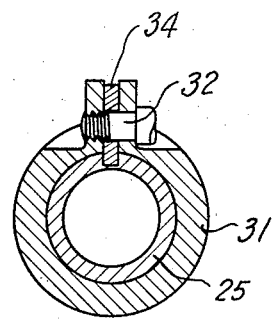
Fig. 6 is an enlarged cross sectional view taken substantially on line 6—6 of Fig. 4.
Figure 7:
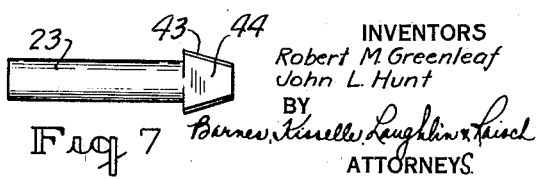
Fig. 7 is a view of one of the pins used in the clamping of the attaching device to a wheel.

The ends of the tightening pins 23 which project through the elongated passages 24 have enlarged heads 43 with tapered surfaces for cooperative engagement with a circumferential interior tapered surface 44 on the tightening member 42. The tapered heads 43 are cut away on opposite sides as shown at 44 (Fig. 5) for sliding movement in slots 24a in an annular rib 15a of the body, the slots 24a being in effect parts of the elongated slots 24.

It will be observed in this construction that after assembly the springs 19 urge the arms radially outwardly causing the tapered heads of the pins to abut the internal tapered surface 44 of the tightening member. Also the pins serve to key the arms against rotation on their axes. As the tightening member is turned to cause it to feed to the left as Fig. 1 is viewed the arms are drawn inwardly against the action of the springs 19. As the tightening member is turned to cause it to back away the springs 19 urge the arms outwardly.

For the purpose of mounting the gauging instrument on the attachment there is preferably an adjustable mounting member in the form of an inner piece 45 press fitted or otherwise secured to the stud 40. Projecting through the member 45 is a bolt 46 having a head 47 lying within the member 45 and within the stud 40, which are hollow for the purpose, the stud projecting through an aperture 48 with clearance as shown. An outer member 50 is placed over the bolt and the two members have interfacial surfaces of spherical form as at 51 which provides for a universal adjustment of the bolt 46 relative to the stud 40 within the limits provided by the clearance 48. Over the stud is positioned a gauge carrier spindle in the form of tube 55 designed to be received in the aperture 6 in the instrument 5 and a nut 56 is screw threaded to the end of the bolt 46 as at 57. When this nut is tightened the spindle sleeve 55 is placed under compression and the outer part 50 with the concaved spherical surface is pressed to engagement with the inner part 45 with the convex surface. Thus the axis of the spindle 55 is universally adjustable so that it may be brought into true alignment with the wheel axis and this adjustment may be maintained by the tightening of the nut 56.

In use, when the attachment is to be secured to a wheel, the diameter of the wheel may be ascertained and the gripper arms adjusted to the radial arms by the clamping bolts 32 in a position corresponding to the wheel diameter as indicated by the scales 35. This may be termed by a rough adjustment. Then the three hardened screw members, while the tightening plate 42 is retracted, are placed over the edge of the wheel rim. Then the tightening member 42 is advanced and the arms are drawn inwardly and the hardened gripper screws cause to engage and bite into the material of the rim. In this way the device is quickly attachable to any wheel within the appropriate sizes. In Fig. 1 a form of stream line wheel is shown where the side wall of the pneumatic tire 2a is substantially flush with the outer edge of the wheel rim 3a. In this case the gripper screws may be advanced and caused to project into the rubber of the tire. In Fig. 2 an illustration is shown along the lines of the conventional tire and rim as used on automotive vehicles wherein the tire is at 2b and the rim at 3b. In this case the gripper screw may not be so far advanced as shown.

The instrument may be supplied with one or more extra sets of tubular arm extensions so that longer tubular extensions may be used where it is necessary to attach the device to wheels of large diameter. On the other hand the gripper arms 30 may be reversed in position as shown in Fig. 3 for attachment to a device of small diameter such for example, as the hub or hub portion 60 of any wheel.

We claim:

1. A wheel attachment for securing a gauging instrument or the like to a wheel for checking wheel action as it rolls along the ground or floor with the instrument operating on the ground or floor comprising a body, a plurality of arms carried by the body for sliding movement in and out, an axis member on the body having screw threads, a clamping member mounted on the screw threads, a projection carried by each arm, means on the arms for engaging and gripping the peripheral portion of a wheel, and an inclined surface on the clamping member for engaging the projections and urging the arms inwardly to cause the said means to engage and grip a peripheral portion of the wheel.

2. A wheel attachment for securing a gauging instrument or the like to a wheel for checking wheel action as it rolls along the ground or floor with the instrument operating on the ground or floor comprising a body, the plurality of substantially radially extending arms for sliding movement substantially radially, a screw threaded axis member on the body, a clamping member mounted on the screw threads, a projection carried by each arm, a circumferential internal cam face on the clamping member for engaging the projections for shifting the arms inwardly as the clamping member is fed upon the screw threads, spring means for urging the arms radially outwardly and a gripping member on each arm for engaging and gripping a peripheral surface of the wheel.

3. A wheel attachment for securing a gauging instrument or the like to a wheel for checking wheel action as it rolls along the ground or floor with the instrument operating on the ground or floor comprising a body, the plurality of substantially radially extending arms, means mounting the arms for sliding movement substantially radially, a screw threaded axis member on the body, a clamping member mounted on the screw threads, a pin secured to each arm and projecting laterally therefrom, said body having an elongated slot for each pin whereby the pins hold the arms against rotation and permit the arms to shift substantially radially, said pins having tapered heads, the clamping member having an internal circumferential cam face for engaging the pin heads, whereby to retract the pin heads and arms inwardly as the gripping member is fed upon the screw threads.

4. A wheel attachment for securing a gauging instrument or the like to a wheel for checking wheel action as it rolls along the ground or floor with the instrument operating on the ground or floor comprising a body, the plurality of substantially radially extending arms, means mounting the arms for sliding movement substantially radially, a screw threaded axis member on the body, a clamping member mounted on the screw threads, a pin secured to each arm and projecting laterally therefrom, said body having an elongated slot for each pin whereby the pins hold the arms against rotation and permit the arms to shift substantially radially, said pins having tapered heads, the clamping member having an internal circumferential cam face for engaging the pin heads, whereby to retract the pin heads and arms inwardly as the gripping member is fed upon the screw threads and the spring means for urging the arms outwardly.

5. A wheel attachment for securing a gauging instrument or the like to a wheel for checking wheel action as it rolls along the ground or floor with the instrument operating on the ground or floor comprising a body having a plurality of radially extending portions, an arm slidably mounted in each portion for radial movement, spring means tending to urge the arms radially outwardly, a screw threaded stud affixed on the axis of the body, a clamping member provided with a recess having an internal cam shaped surface screw threaded to the stud, a projection carried by each arm and lying within the recess of the clamping member and engaging the cam surface so that actuation of the cam member axially on the screw threads retracts the arms inwardly against the spring means and gripping members on the arms for engaging and gripping the peripheral edge of a wheel.

6. A wheel attachment for securing a gauging instrument or the like to a wheel for checking wheel action as it rolls along the ground or floor with the instrument operating on the ground or floor comprising a body member, a plurality of arms slidably carried by the body for substantially radial movement, means common to all the arms for shifting the same radially, each arm comprising a rod, a tubular extension attached thereto, a bracket adjustably mounted on the tubular extension and a gripper member on the bracket for engaging and gripping a peripheral edge of a wheel.

7. A wheel attachment for securing a gauging instrument or the like to a wheel for checking wheel action as it rolls along the ground or floor with the instrument operating on the ground or floor comprising a body member, a plurality of arms slidably carried by the body for substantially radial movement, means common to all the arms for shifting the same radially, a gripper bracket secured to the outer portion of each arm and a gripper member comprising a hardened screw threaded into the bracket and adapted to engage over and grip a peripheral edge of a wheel or hub.

8. A wheel attachment for securing a gauging instrument or the like to a wheel for checking wheel action as it rolls along the ground or floor with the instrument operating on the ground or floor comprising a body member, a plurality of arms slidably carried by the body for substantially radial movement, means common to all the arms for shifting the same radially, each arm comprising a rod, a tubular extension on the outer end of the rod, a gripper bracket having a clamping portion adjustably clamped to the tubular extension, the tubular extension having a scale thereon for indicating adjustments corresponding to the diameter of the work to be engaged and a gripper member carried by the bracket adapted to engage and grip a peripheral edge of a wheel or hub upon actuation of the common means for shifting the arms inwardly.

9. A wheel attachment for securing a gauging instrument or the like to a wheel in a swiveled manner for checking wheel action as it rolls along the ground or floor with the instrument operating on the ground or floor comprising a body member, means operable to attach the body member to a wheel, a stud on the axis member substantially co-axial to the wheel axis, a member on the stud having an outer convex surface, a bolt extending through the last named member with clearance, a cooperating member on the bolt with a concaved surface for fitting the said convex surface, a tubular spindle on the bolt, the concave surfaces of the two members providing for adjustment of the spindle, whereby the same may be adjusted relative to the wheel axis and a nut cooperating with the free end of the bolt and spindle sleeve for clamping the said two members in adjusted position.

ROBERT M. GREENLEAF.
JOHN L. HUNT.